(12) United States Patent
Kinoshita

(10) Patent No.: US 10,964,958 B2
(45) Date of Patent: Mar. 30, 2021

(54) METHOD FOR MANUFACTURING INTEGRATED SHEET

(71) Applicant: TOYOTA JIDOSHA KABUSHIKI KAISHA, Toyota (JP)

(72) Inventor: Katsuhiko Kinoshita, Nisshin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 95 days.

(21) Appl. No.: 16/267,922

(22) Filed: Feb. 5, 2019

(65) Prior Publication Data

US 2019/0305330 A1 Oct. 3, 2019

(30) Foreign Application Priority Data

Mar. 29, 2018 (JP) .............................. JP2018-063848

(51) Int. Cl.
*B29C 65/00* (2006.01)
*H01M 8/0273* (2016.01)
*H01M 8/1018* (2016.01)
*B29C 65/14* (2006.01)
*B29C 65/16* (2006.01)
*B29C 65/48* (2006.01)

(52) U.S. Cl.
CPC ....... *H01M 8/0273* (2013.01); *B29C 65/1406* (2013.01); *B29C 65/1606* (2013.01); *B29C 65/4845* (2013.01); *H01M 2008/1095* (2013.01)

(58) Field of Classification Search
CPC ............ B29C 65/1406; B29C 65/1606; B29C 65/4845

See application file for complete search history.

(56) References Cited

U.S. PATENT DOCUMENTS

| | | | | |
|---|---|---|---|---|
| 2008/0145712 | A1* | 6/2008 | Pierpont | B32B 37/203 429/509 |
| 2012/0165420 | A1* | 6/2012 | Bhikhi | H01M 8/1072 521/27 |
| 2015/0210052 | A1* | 7/2015 | Wulff | H01M 8/0273 156/273.5 |
| 2016/0104909 | A1* | 4/2016 | Kawasumi | H01M 8/0297 429/535 |

(Continued)

FOREIGN PATENT DOCUMENTS

| | | |
|---|---|---|
| JP | 2002-365652 A | 12/2002 |
| JP | 2007-287608 A | 11/2007 |

*Primary Examiner* — Mark A Osele
*Assistant Examiner* — Nickolas R Harm
(74) *Attorney, Agent, or Firm* — Oliff PLC

(57) ABSTRACT

A method for manufacturing an integrated sheet of a MEGA and a resin frame, capable of curing a UV curable adhesive in a short time by suppressing an inhibition of curing of the UV curable adhesive and thereby providing excellent productivity is provided. A manufacturing method for an integrated sheet in which a resin frame is bonded to a MEGA, includes preparing a laminate in which a gas diffusion layer is laminated on at least one surface of a MEA, applying a coating of an UV curable adhesive to the laminate; placing a resin frame on the UV curable adhesive and applying a pressure to the frame, and irradiating the UV curable adhesive with ultraviolet rays, in which the irradiating includes a first irradiation step, and a second irradiation step in which ultraviolet rays are applied with irradiation intensity higher than irradiation intensity in the first irradiation step.

5 Claims, 4 Drawing Sheets

(56) References Cited

U.S. PATENT DOCUMENTS

| | | | | |
|---|---|---|---|---|
| 2016/0260989 A1* | 9/2016 | Ikeda | .................. | H01M 8/0273 |
| 2016/0260993 A1* | 9/2016 | Ikeda | .................. | H01M 8/0286 |
| 2016/0285119 A1* | 9/2016 | Hayashi | ................ | H01M 8/241 |
| 2016/0293976 A1* | 10/2016 | Kanai | ................. | H01M 8/0297 |
| 2017/0025688 A1* | 1/2017 | Ikeda | .................. | H01M 8/0286 |
| 2018/0159160 A1* | 6/2018 | Okabe | ................. | H01M 8/0247 |
| 2018/0366744 A1* | 12/2018 | Sato | ................... | H01M 8/0286 |

* cited by examiner

US 10,964,958 B2

METHOD FOR MANUFACTURING INTEGRATED SHEET

CROSS REFERENCE TO RELATED APPLICATIONS

This application is based upon and claims the benefit of priority from Japanese patent application No. 2018-63848, filed on Mar. 29, 2018, the disclosure of which is incorporated herein in its entirety by reference.

BACKGROUND

The present disclosure relates to a method for manufacturing an integrated sheet of a membrane electrode gas diffusion layer assembly and a resin frame used for a fuel cell.

As a membrane electrode gas diffusion layer assembly (MEGA: Membrane Electrode Gas diffusion layer Assembly) for a fuel cell, an integrated sheet including the aforementioned MEGA and a frame-shaped resin frame disposed on the periphery of the MEGA has been known.

Japanese Unexamined Patent Application Publication No. 2007-287608 discloses a fuel cell in which a fuel-cell sealing plate and a separator are fixed by an adhesive, and discloses an example in which an ultraviolet (UV) curable adhesive is used as the adhesive.

SUMMARY

In general, a UV curable adhesive is cured by irradiating it with a predetermined cumulative amount of light [mJ/cm$^2$] (=Irradiation intensity [mW/cm$^2$]×Irradiation time [sec]) according to its material. The present inventor has examined whether it is possible to reduce the irradiation time by increasing the irradiation intensity when the resin frame is bonded to the MEGA in order to improve the productivity. However, it has been found that in the case where the irradiation intensity is increased, in some cases, the curing is insufficient even when the amount of UV rays applied to the UV curable adhesive reaches the predetermined cumulative amount of light.

The present disclosure has been made in view of the above-described circumstance and an object thereof is to provide a method for manufacturing an integrated sheet of a membrane electrode gas diffusion layer assembly and a resin frame, capable of curing a UV curable adhesive in a short time by suppressing an inhibition of curing of the UV curable adhesive and thereby providing excellent productivity.

A first exemplary aspect is a manufacturing method for an integrated sheet in which a resin frame is bonded to a membrane electrode gas diffusion layer assembly (MEGA), including:
preparing a laminate in which a gas diffusion layer is laminated on at least one surface of a membrane electrode assembly;
applying a coating of an ultraviolet (UV) curable adhesive to the laminate;
placing a resin frame on the UV curable adhesive and applying a pressure to the resin frame; and
irradiating the UV curable adhesive with ultraviolet rays, in which
the irradiating includes a first irradiation step, and a second irradiation step in which ultraviolet rays are applied with irradiation intensity higher than irradiation intensity in the first irradiation step.

In an embodiment of the above-described manufacturing method for the integrated sheet, the second irradiation step is started after the first irradiation step is started and before a temperature of the resin frame reaches a temperature at which radical quenching occurs.

According to the present disclosure, it is possible to provide a method for manufacturing an integrated sheet of a membrane electrode gas diffusion layer assembly and a resin frame, capable of curing a UV curable adhesive in a short time by suppressing an inhibition of curing of the UV curable adhesive and thereby providing excellent productivity.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Firstly, an outline of a method for manufacturing an integrated sheet in which a resin frame is bonded to a membrane electrode gas diffusion layer assembly (MEGA) according to this embodiment is described with reference to FIGS. 1A to 1E. FIGS. 1A to 1E are a schematic process diagram showing an example of the manufacturing method according to this embodiment. Note that FIGS. 1A to 1E show a schematic cross section of a joint part of the integrated sheet. A manufacturing method for an integrated sheet shown in the example shown in FIGS. 1A to 1E include a step of preparing a laminate in which a gas diffusion layer 12 is laminated on at least one surface of a membrane electrode assembly (MEA) 11 (FIG. 1A), a step of applying a coating of an ultraviolet (UV) curable adhesive 13 to the laminate (FIG. 1B); a step of placing a resin frame 14 on the UV curable adhesive 13 and applying a pressure to the resin frame 14 (FIG. 1C), and a step of irradiating the UV curable adhesive 13 with ultraviolet rays 21 (FIG. 1D). Further, the irradiating step includes a first irradiation step, and a second irradiation step in which UV rays are applied with irradiation intensity higher than irradiation intensity in the first irradiation step. Note that the first and second irradiation steps are usually performed in a continuous manner.

Figure 1A:
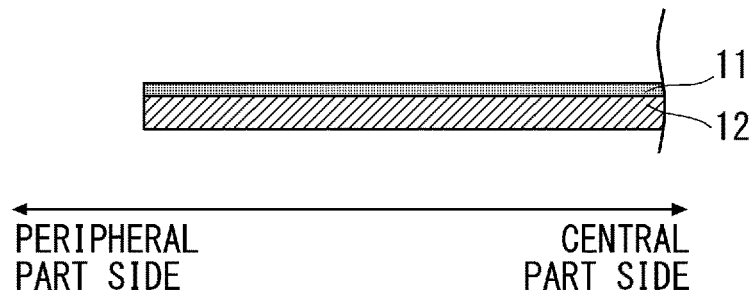
FIG. 1A is a view for describing the schematic process of a manufacturing method according to this embodiment (a step of preparing a laminate)

In this embodiment, firstly, a laminate in which a gas diffusion layer 12 is laminated on at least one surface of a membrane electrode assembly (MEA) 11 is prepared (FIG. 1A).

In the membrane electrode assembly 11, electrodes are bonded to both surfaces of its electrolyte membrane. Any type of configurations known for fuel cells can be used for the electrolyte membrane and the electrodes. As an example, a solid polymer membrane or the like can be used for the electrolyte membrane. As an example, an electrode catalyst layer or the like can be used for the electrode. Further, a commercially-available membrane electrode assembly may be used in this embodiment.

The gas diffusion layer 12 is a layer in which a gas used for an electrode reaction is diffused in a surface direction of the membrane electrode assembly. As an example, a porous conductive base material having a gas diffusion property, such as a carbon fiber base material, a graphite fiber base material, and a foam metal, is used.

In the manufacturing method according to this embodiment, the laminate in which the gas diffusion layer 12 is laminated on at least one surface of the membrane electrode assembly 11 is used. For example, an assembly in which a gas diffusion layer for an anode is laminated on the membrane electrode assembly 11 can be used. In this case, after manufacturing an integrated sheet by the manufacturing method according to this embodiment, a gas diffusion layer 16 for a cathode may be provided on the manufactured integrated sheet (FIG. 1E).

Figure 1B:
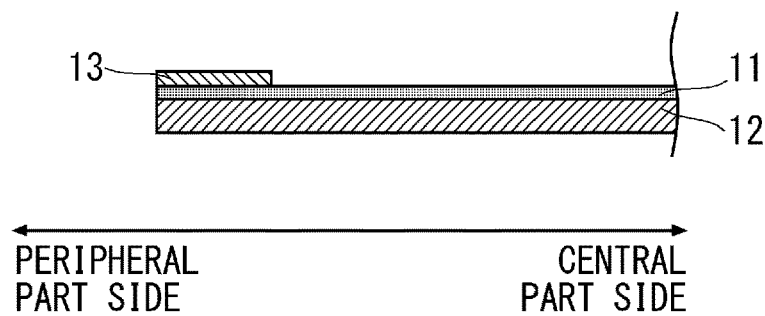
FIG. 1B is a view for describing the schematic process of a manufacturing method according to this embodiment (a coating step)

Next, a coating of a UV curable adhesive 13 is applied to the laminate (FIG. 1B). A coating of the UV curable adhesive 13 is selectively applied to a part where a later-described resin frame is placed. Typically, a coating of the UV curable adhesive 13 is selectively applied to the periphery of the laminate. The coating method is not limited to any particular methods. That is, various coating methods and printing methods can be selected and used as desired. As an example of the coating method, it is possible to selectively apply a coating of a UV curable adhesive to a necessary place by using a screen printing method. The coating surface of the laminate may be the membrane electrode assembly 11 as shown in the example shown in FIG. 1B. Alternatively, a gas diffusion layer 12 having a surface larger than the membrane electrode assembly 11 may be used and a coating of the UV curable adhesive 13 may be applied to the surface of the gas diffusion layer 12.

The UV curable adhesive 13 can be selected from publicly-known adhesives as desired. Examples of the UV curable adhesive 13 include an acrylic adhesive.

Figure 1C:
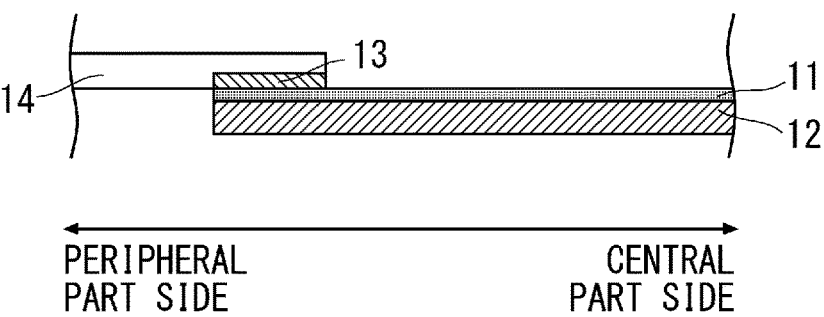
FIG. 1C is a view for describing the schematic process of a manufacturing method according to this embodiment (a pressurizing step)
Figure 1D:
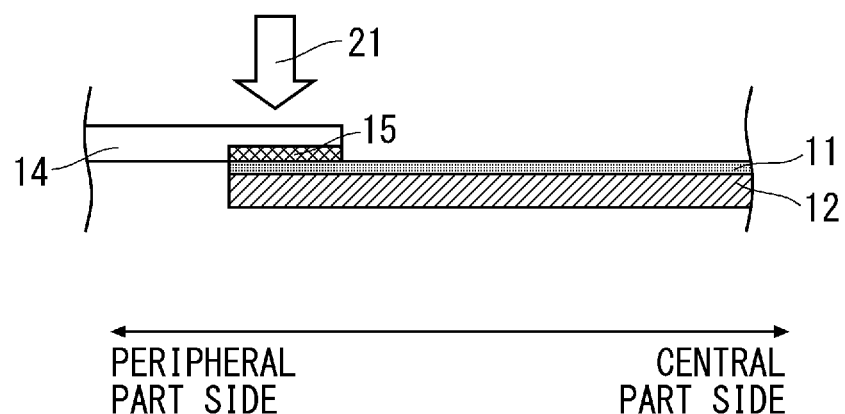
FIG. 1D is a view for describing the schematic process of a manufacturing method according to this embodiment (an irradiation step)
Figure 1E:
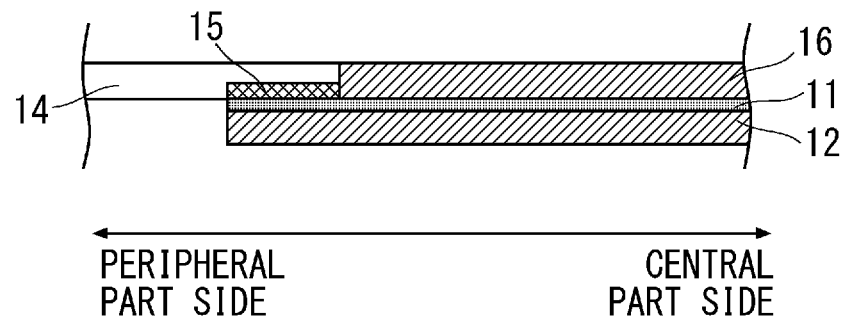
FIG. 1E is a view for describing the schematic process of a manufacturing method according to this embodiment (a step of providing a gas diffusion layer)

Next, a resin frame 14 is placed on the UV curable adhesive 13 and a pressure is applied to the resin frame 14. After that, the UV curable adhesive 13 is irradiated with UV rays 21 (FIGS. 1C and 1D).

An insulating film can be used as the resin frame 14. Further, in this embodiment, a transparent film is used as the resin frame 14. Examples of the material for the resin frame 14 include polyethylene, polypropylene, etc.

Typically, the UV rays 21 are applied to the UV curable adhesive 13 through the transparent resin frame 14 as shown in the example shown in FIG. 1D, and as a result, the UV curable adhesive is cured (15).

In this embodiment, the UV-ray irradiation step is divided into two steps, i.e., a first irradiation step in which UV rays having relatively low irradiation intensity is applied, and a second irradiation step in which UV rays having irradiation intensity higher than the irradiation intensity in the first irradiation step is applied. By doing so, it is possible to suppress an inhibition of curing of the UV curable adhesive and thereby cure the UV curable adhesive in a short time.

Figure 3:
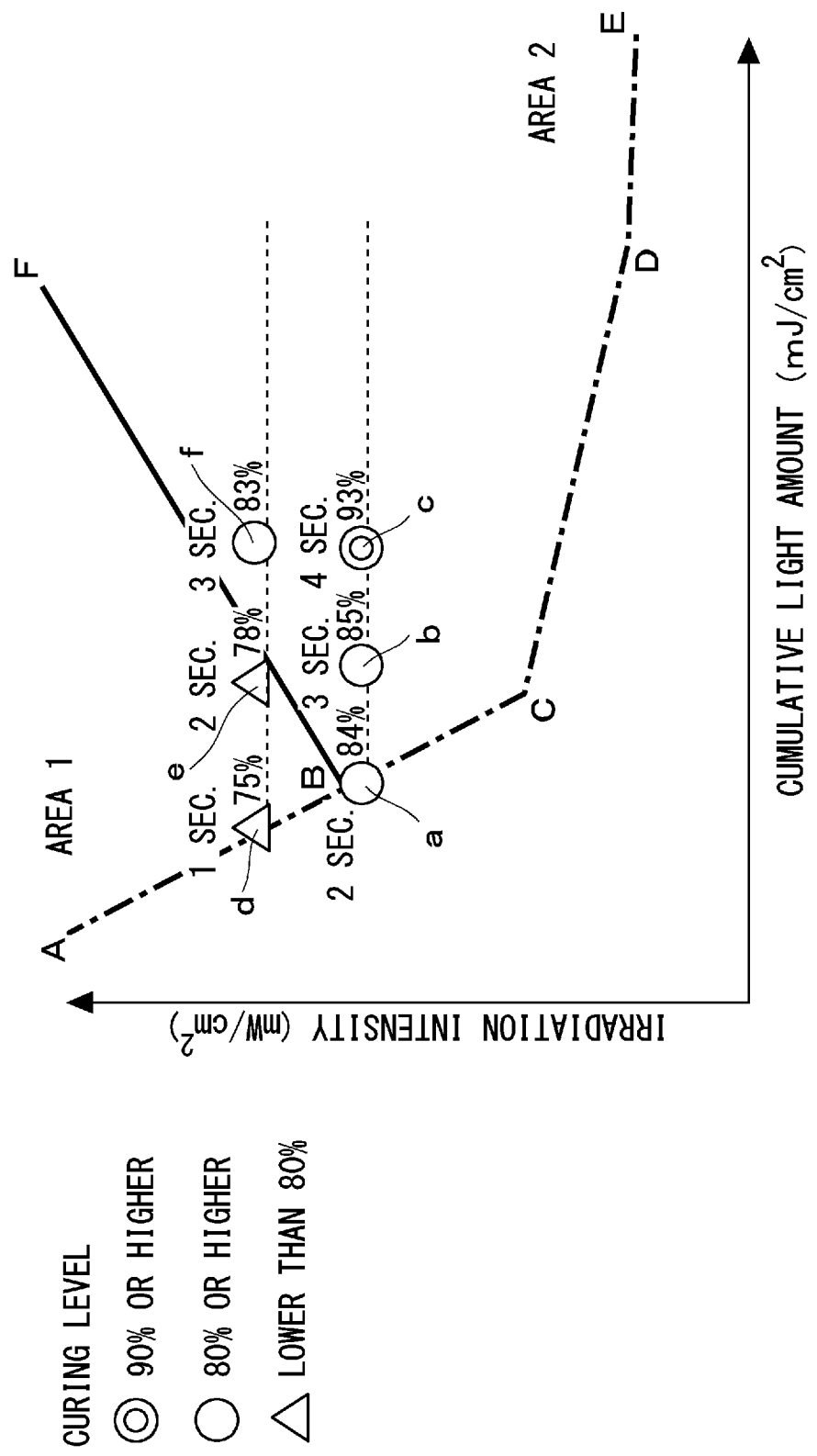
FIG. 3 is a graph showing results of experiments for curing of UV curable adhesives.

A mechanism by which curing of a UV curable adhesive is inhibited is explained hereinafter with reference to FIG. 3. FIG. 3 is a graph showing results of experiments for curing of UV curable adhesives. In the graph shown in FIG. 3, a vertical axis represents UV-ray irradiation intensity [mW/cm$^2$] and a horizontal axis represents cumulative amounts of light [mJ/cm$^2$] (=UV-ray irradiation intensity [mW/cm$^2$]× Irradiation time [sec]). That is, points in the graph shown in FIG. 3 specify UV-ray irradiation conditions. Note that in the curing experiments shown in FIG. 3, the UV-ray irradiation intensity was constant, i.e., was not changed during the irradiation process. In FIG. 3, an area defined by line segments AB and AF is defined as an area 1, and an area defined by line segments BF, BC, CD, and DF is defined as an area 2. When UV rays were directly applied to the UV curable adhesive itself, the level of curing (hereinafter also referred to as the "curing level") of the UV curable adhesive was 80% or higher irrespective of the irradiation conditions for the areas 1 and 2.

Next, points a to f in FIG. 3 indicate curing levels when UV rays were applied under the conditions corresponding to the respective points after the state shown in FIG. 1C was prepared. For example, the points a, b and c show results that were obtained by changing the cumulative amount of light (hereinafter also referred to as the "cumulative light amount") by changing the irradiation times from two seconds to four seconds while maintaining the irradiation intensity unchanged. Further, the points d, e and f show result that were obtained by applying UV rays with irradiation intensity higher than the irradiation intensity for the point a. Based on a comparison between the points a to c and the points d to f, it can be understood that there is a tendency that as the irradiation intensity is increased while maintaining the cumulative light amount unchanged, the curing level decreases. Further, based on a comparison between the points a and e, the curing level of the point e is lower than that of the point a, even though the cumulative light amount of the point e is larger than that of the point a. Based on this result, it is expected that as the irradiation intensity is increased, the inhibition of curing increases.

The condition for the points d and e was the same as the condition under which the curing level of the UV curable adhesive was 80% or higher when no resin frame was provided. However, it is understood that when UV rays were applied through the resin frame, the curing level decreased. Based on the above-described curing experiments carried out under various conditions, it has been found that when UV rays are applied to the UV curable adhesive through the resin frame, the curing level is sufficient under the aforementioned condition for the area 2 but it is insufficient under the condition for the area 1.

As a result of intensive studies, the present inventor has found that when UV rays are applied to an UV curable adhesive through a resin frame, a temperature of the resin frame rises and an antioxidant and the like contained in the resin frame elute (e.g., flow out). It is presumed that the eluting antioxidant moves into the UV curable adhesive and acts as a quencher for the radical, and as a result, the curing of the UV curable adhesive is inhibited.

Figure 2:
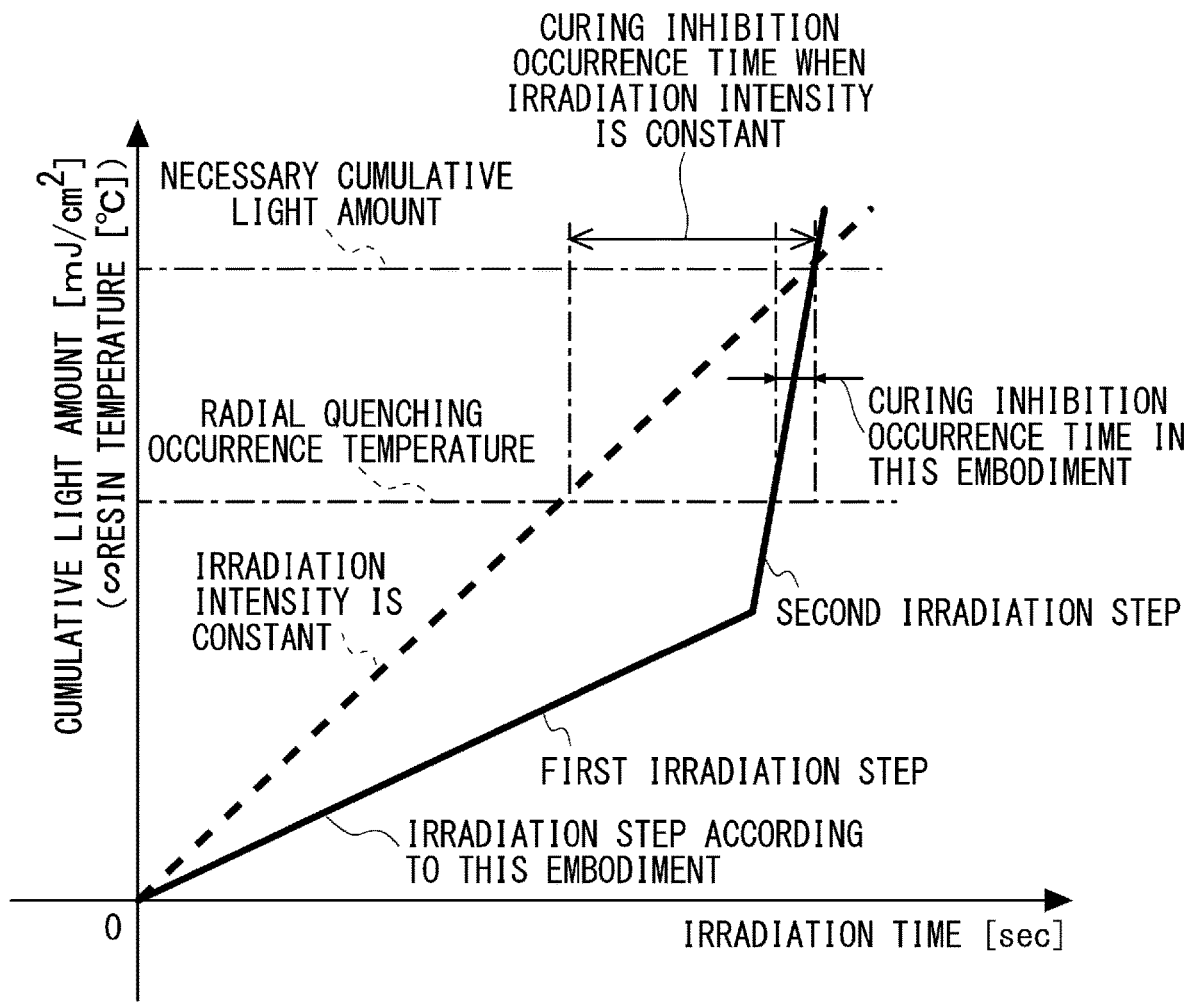
FIG. 2 is a graph for illustrating that an inhibition of curing is suppressed by a manufacturing method according to an embodiment.

Based on the above-described finding, the present inventor has examined how to reduce the time period in which the resin frame becomes a high-temperature state and how to minimize the elution (e.g., the flowing-out) of the antioxidant and the like, and thereby completed the present disclosure. Descriptions are given with reference to FIG. 2. FIG. 2 is a graph for illustrating that an inhibition of curing is suppressed by a manufacturing method according to this embodiment. In the graph shown in FIG. 2, a horizontal axis represents irradiation time [sec] and a vertical axis represents cumulative light amounts [mJ/cm$^2$]. Note that the temperature of the resin frame is roughly in proportion to the cumulative light amount. When the temperature of the resin frame reaches a certain temperature or higher, radical quenching occurs in the UV curing resin and hence the curing is inhibited. In the irradiation step according to this embodiment, UV-ray irradiation is performed with relatively low irradiation intensity in a first irradiation step, so that the rise in the temperature of the resin frame is suppressed. Then, a second irradiation step is started by increasing the irradiation intensity before the temperature of the resin frame reaches the temperature at which radical quenching occurs. Since the necessary cumulative light amount is achieved in a short time by the second irradiation step, it is possible to shorten the time period during which the curing is inhibited, compared to the case where the irradiation intensity is constant.

Regarding the method for switching from the first irradiation step to the second irradiation step, for example, optimal irradiation intensity and irradiation time may be determined for combinations of UV curable adhesives and resin frames in advance through experiments. Then, the switching of the irradiation step may be controlled based on the irradiation time. Alternatively, for example, the temperature of the resin frame may be measured by a thermocouple or the like and the irradiation intensity may be changed according to the temperature of the resin frame.

According to the method for manufacturing an integrated sheet in accordance with this embodiment, it is possible to reduce the time period in which the resin frame becomes a high-temperature state and thereby suppress the elution of curing inhibition substances such as an antioxidant. As a result, it is possible to cure the UV curable adhesive in a short time and thereby achieve excellent productivity of integrated sheets.

For example, a membrane electrode gas diffusion layer assembly (MEGA) may be formed by bonding a gas diffusion layer to an integrated sheet obtained by the manufacturing method according to this embodiment (FIG. 1E). Further, a fuel cell can also be produced by further providing a separator and other arbitrary structures, though not shown in the figures.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A manufacturing method for an integrated sheet in which a resin frame is bonded to a membrane electrode gas diffusion layer assembly (MEGA), comprising:
    preparing a laminate in which a gas diffusion layer is laminated on at least one surface of a membrane electrode assembly;
    applying a coating of an ultraviolet (UV) curable adhesive to the laminate;
    placing a resin frame on the UV curable adhesive and applying a pressure to the resin frame; and
    irradiating the UV curable adhesive with ultraviolet rays, wherein
    the irradiating includes a first irradiation step, and a second irradiation step in which ultraviolet rays are applied with irradiation intensity higher than irradiation intensity in the first irradiation step, and
    the second irradiation step is started after the first irradiation step is started and before a temperature of the resin frame reaches a temperature at which radical quenching occurs.

2. The method according to claim 1, wherein the UV curable adhesive is irradiated with ultraviolet rays through the resin frame.

3. The method according to claim 1, wherein the irradiating the UV curable adhesive with ultraviolet rays includes switching from the irradiation intensity in first irradiation step to the irradiation intensity in the second irradiation step.

4. The method according to claim 1, wherein the first irradiation step ends before the temperature of the resin frame reaches the temperature at which radical quenching occurs.

5. The method according to claim 1, wherein the second irradiation step continues after the temperature of the resin frame reached the temperature at which radical quenching occurs.

* * * * *